(12) United States Patent
Yogo et al.

(10) Patent No.: US 12,344,212 B2
(45) Date of Patent: Jul. 1, 2025

(54) BRAKING CONTROL DEVICE FOR VEHICLE

(71) Applicant: ADVICS CO., LTD., Kariya (JP)

(72) Inventors: Kazutoshi Yogo, Kariya (JP); Masataka Sakaue, Kariya (JP)

(73) Assignee: ADVICS CO., LTD., Kariya (JP)

( * ) Notice: Subject to any disclaimer, the term of this patent is extended or adjusted under 35 U.S.C. 154(b) by 581 days.

(21) Appl. No.: 17/642,749

(22) PCT Filed: Sep. 16, 2020

(86) PCT No.: PCT/JP2020/034994
§ 371 (c)(1),
(2) Date: Mar. 14, 2022

(87) PCT Pub. No.: WO2021/054343
PCT Pub. Date: Mar. 25, 2021

(65) Prior Publication Data
US 2022/0324428 A1 Oct. 13, 2022

(30) Foreign Application Priority Data
Sep. 17, 2019 (JP) .................. 2019-168772

(51) Int. Cl.
*B60T 17/22* (2006.01)
*B60T 8/1761* (2006.01)
*B60T 11/26* (2006.01)

(52) U.S. Cl.
CPC ............ *B60T 17/22* (2013.01); *B60T 8/1761* (2013.01); *B60T 11/26* (2013.01); *B60T 2270/10* (2013.01)

(58) Field of Classification Search
CPC ........ B60T 17/18; B60T 13/268; B60T 17/22; B60T 8/26; B60T 8/1761; B60T 2270/10
See application file for complete search history.

(56) References Cited

U.S. PATENT DOCUMENTS

2017/0015290 A1 1/2017 Oosawa et al.
2018/0297562 A1* 10/2018 Ishikawa ............... B60T 13/662
(Continued)

FOREIGN PATENT DOCUMENTS

| JP | 2018083628 A | 5/2018 |
| JP | 2018176757 A | 11/2018 |
| JP | 2019085028 A | 6/2019 |

OTHER PUBLICATIONS

JP 2018083628 A (Year: 2018).*
(Continued)

*Primary Examiner* — Robert A. Siconolfi
*Assistant Examiner* — Mahbubur Rashid
(74) *Attorney, Agent, or Firm* — BUCHANAN INGERSOLL & ROONEY PC

(57) ABSTRACT

A braking control device includes a "master cylinder CM capable of pressure feeding brake fluid BF in conjunction with the movement of a brake operating member BP of a vehicle", an "electrically driven fluid unit HU", "front wheel and rear wheel cylinders CWf, CWr that are provided on the front wheel and rear wheel WHf, WHr of the vehicle and are pressurized by either one of the master cylinder CM and the fluid unit HU", and a "controller ECU that controls the fluid unit HU". The controller ECU determines whether or not external leakage of a brake fluid BF has occurred in the braking control device, and when the external leakage has occurred, pressurizes the front wheel cylinder CWf by the master cylinder CM, and pressurizes the rear wheel cylinder CWr by the fluid unit HU.

3 Claims, 3 Drawing Sheets

(56) References Cited

U.S. PATENT DOCUMENTS

2018/0297569 A1    10/2018   Oosawa et al.
2019/0248348 A1*    8/2019   Ganzel .................. B60T 13/745

OTHER PUBLICATIONS

JP 2018176757 A (Year: 2018).*
JP 2019085028 A (Year: 2019).*
WO 2018168307 A1 (Year: 2018).*
JP 2018149936 A (Year: 2018).*
CN 106335490 B (Year: 2019).*
JP 6191506 B2 (Year: 2017).*
International Search Report (PCT/ISA/210) with translation and Written Opinion (PCT/ISA/237) mailed on Nov. 10, 2020, by the Japanese Patent Office as the International Searching Authority for International Application No. PCT/JP2020/034994. (9 pages).

* cited by examiner

BRAKING CONTROL DEVICE FOR VEHICLE

TECHNICAL FIELD

The present disclosure relates to a braking control device for a vehicle.

BACKGROUND ART

Patent Literature 1 describes, for the purpose of "providing a brake control device, a brake control method, and a brake system capable of reducing a response delay of a braking force with respect to a brake operation of a driver", that "when predetermined information is input, a primary piston 32P is moved to generate a brake fluid pressure based on a brake pedal operation of a driver in a first fluid path 11P connecting a primary fluid pressure chamber 31P of a master cylinder 3 that generates a brake fluid pressure and P-system wheel cylinders 8a and 8d, and a secondary piston 32S having a shorter maximum stroke amount with respect to the primary piston 32P is moved to generate a brake fluid pressure in a first fluid path 11S connecting a secondary fluid pressure chamber 31S of the master cylinder 3 that generates a brake fluid pressure and S-system wheel cylinders 8b and 8c by a fluid pressure source (pump 7) different from the master cylinder 3. The predetermined information is information indicating that a detection value of a fluid surface level sensor that detects the fluid surface level of the brake fluid stored in a reservoir tank connected to the master cylinder is below a fluid surface level decrease threshold".

In the control device described in Patent Literature 1, deflection of the vehicle may occur when the fluid surface level decreases. The reason therefor will be described below. In this situation, the wheel cylinders 8a and 8d of the left front wheel and the right rear wheel, which are P systems, are pressurized by the master cylinder according to the brake pedal operation of the driver. On the other hand, the wheel cylinders 8b and 8c of the right front wheel and the left rear wheel of the S system are pressurized by a fluid pressure source (pump 7) different from the master cylinder 3. Usually, a pressurization amount by a fluid pressure source such as a pump is larger than a pressurization amount by a driver's brake pedal operation. Therefore, since a fluid pressure difference (as a result, the right/left difference of the braking force) occurs between the P-system wheel cylinders and the S-system wheel cylinders, the vehicle deflects rightward. In such a braking control device, that in which vehicle deflection can be suppressed is desired.

Patent Literature 2 describes, "for the purpose of providing a brake device, a brake system, and a method for controlling the brake device capable of suppressing a decrease in brake fluid amount in a fluid reservoir portion" that "in the process of decreasing the wheel cylinder fluid pressure Pw toward zero, a control unit 100 delays the timing for shifting a shut-off valve 21 from the valve-closed state to the valve-open state and the timing for shifting a communicating valve 26 from the valve-open state to the valve-closed state than the timing for shifting a pressure adjusting valve 27 from the valve-closed state to the valve-open state." In the control device of Patent Literature 2, the decrease (i.e., external leakage of brake fluid) in the brake fluid amount in the fluid reservoir portion (also referred to as "master reservoir") is suppressed, but in such a braking control device, it is desired that vehicle deceleration can be appropriately secured when external leakage of the brake fluid occurs in addition to suppressing decrease in the brake fluid amount.

CITATIONS LIST

Patent Literature

Patent Literature 1: Japanese Unexamined Patent Application Publication No. 2019-085028
Patent Literature 2: Japanese Unexamined Patent Application Publication No. 2018-176757

SUMMARY OF DISCLOSURE

Technical Problems

An object of the present disclosure is to provide a braking control device for a vehicle capable of suppressing vehicle deflection and appropriately securing vehicle deceleration when external leakage of brake fluid occurs.

Solutions to Problems

A braking control device for a vehicle according to the present disclosure includes a "master cylinder (CM) capable of pressure feeding brake fluid (BF) in conjunction with the movement of a brake operating member (BP) of the vehicle", an "electrically driven fluid unit (HU)", "front wheel and rear wheel cylinders (CWf, CWr) that are provided on a front wheel and a rear wheel (WHf, WHr) of the vehicle and are pressurized by either one of the master cylinder (CM) and the fluid unit (HU)", and a "controller (ECU) that controls the fluid unit (HU)". Then, the controller (ECU) determines whether or not external leakage of a brake fluid (BF) occurs in the braking control device, and pressurizes the front wheel cylinder (CWf) with the master cylinder (CM) and pressurizes the rear wheel cylinder (CWr) with the fluid unit (HU) when the external leakage occurs. According to the above configuration, deflection of the vehicle can be avoided, and sufficient vehicle deceleration can be secured.

In a braking control device for a vehicle according to the present disclosure, the fluid unit (HU) includes fluid pressure modulators (VI, VO) for executing an anti-lock brake control for suppressing an excessively large deceleration slip of the front wheel and the rear wheel (WHf, WHr), where when the external leakage occurs, the controller (ECU) prohibits the operation of the anti-lock brake control on the front wheel (WHf) and permits the operation of the anti-lock brake control on the rear wheel (WHr). According to the above configuration, since the braking force of the front wheel can be sufficiently utilized and the excessively large deceleration slip of the rear wheel is suppressed, the vehicle deceleration can be appropriately secured, and the directional stability of the vehicle can be improved.

SYMBOLS OF CONFIGURING MEMBERS, ETC., AND SUBSCRIPTS AT THE END OF THE SYMBOLS

In the following description, configuring members, calculation processes, signals, characteristics, and values having the same symbol such as "CW" have the same functions. The subscripts "f" and "r" added to the end of symbols related to each wheel are comprehensive symbols indicating which side in the front-rear direction of the vehicle they relate to. Specifically, "f" relates to the front wheel, and "r" relates to the rear wheel. For example, in the wheel cylinder, it is described as a front wheel cylinder CWf and a rear wheel cylinder CWr. Furthermore, the subscripts "f" and "r" can be omitted. In this case, each symbol represents a generic name.

In a connection path HS, a side close to the master reservoir RV (or side distant from the wheel cylinder CW) is referred to as the "upper portion" and a side close to the wheel cylinder CW is referred to as the "lower portion". In addition, in a reflux path HK through which the brake fluid BF circulates, a side close to a discharge portion Bt of the fluid pump HP is referred to as an "upstream side (upstream portion)", and a side distant from the discharge portion Bt is referred to as a "downstream side (downstream portion)".

<First Embodiment of Braking Control Device for Vehicle>

Figure 1:
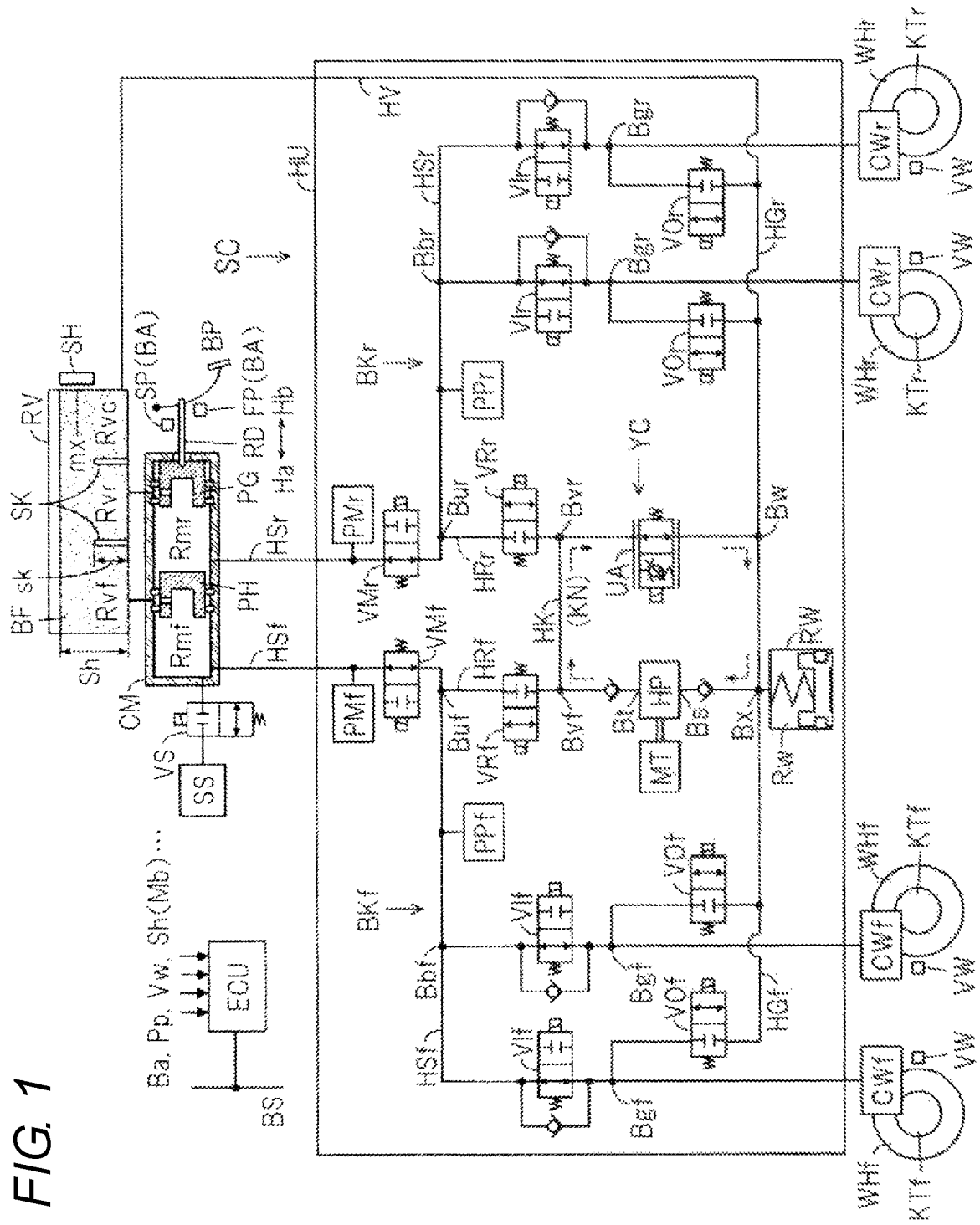
FIG. 1 is an overall configuration view for describing a first embodiment of a braking control device SC for a vehicle.

A first embodiment of a braking control device SC according to the present disclosure will be described with reference to an overall configuration view of FIG. 1. In the first embodiment, of the fluid paths (braking systems) of two systems, the front wheel braking system BKf is connected to the wheel cylinder CWf of the front wheel WHf, and the rear wheel braking system BKr is connected to the wheel cylinder CWr of the rear wheel WHr. That is, a so-called front-rear type (also referred to as "II type") is adopted for the fluid path of two systems. In this case, the front wheel braking system BKf is a braking system related to the front wheel, and the front wheel fluid pressure chamber Rmf is connected to the two front wheel cylinders. In this case, the rear wheel braking system BKr is a braking system related to the rear wheel, and the rear wheel fluid pressure chamber Rmr is connected to the two rear wheel cylinders. The "fluid path" is a path through which the brake fluid BF, which is working liquid, moves, and corresponds to a braking pipe, a fluid path of a fluid unit, a hose, and the like.

A vehicle equipped with the braking control device SC includes a brake operating member BP, a rotation member KT, a wheel cylinder CW, a master reservoir RV, a master cylinder CM, a braking operation amount sensor BA, and a wheel speed sensor VW.

The brake operating member (e.g., brake pedal) BP is a member operated by the driver to decelerate the vehicle. A braking torque Tq of the wheel WH is adjusted, and the braking force is generated at the wheel WH by operating the brake operating member BP. Specifically, a rotation member (e.g., brake disc) KT is fixed to the wheel WH of the vehicle. A brake caliper is arranged so as to sandwich the rotation member KT.

The brake caliper is provided with the wheel cylinder CW. As the pressure (brake fluid pressure) Pw of the brake fluid BF in the wheel cylinder CW is increased, a friction member (e.g., brake pad) is pressed against the rotation member KT. Since the rotation member KT and the wheel WH are fixed to rotate integrally, a braking torque Tq is generated at the wheel WH by the frictional force generated at this time. Then, a braking force (friction braking force) is generated at the wheel WH by the braking torque Tq.

The master reservoir (also referred to as "atmospheric pressure reservoir") RV is a tank for the working liquid, and the brake fluid BF is stored inside. The master reservoir RV supplies the brake fluid BF to the master cylinder CM or the like. The master reservoir RV is partitioned into three fluid reservoir portions Rvf, Rvr, and Rvc by a partition plate SK having a height sk. The front wheel and rear wheel fluid reservoir portions Rvf and Rvr are connected to the front wheel and rear wheel fluid pressure chambers Rmf and Rmr, and supply the brake fluid BF thereto. The pressure adjusting fluid reservoir portion Rvc is connected to the fluid pump HP by way of the reservoir path HV, and supplies the brake fluid BF. In a state where the master reservoir RV is filled with the brake fluid BF, the fluid surface level of the brake fluid BF is above the height sk of the partition plate SK. For this reason, the brake fluid BF can freely move among each fluid reservoir portions beyond the partition plate SK. On the other hand, when the amount of brake fluid BF in the master reservoir RV decreases and the fluid surface level of the brake fluid BF becomes lower than the height sk of the partition plate SK, the front wheel and rear wheel fluid reservoir portions Rvf, Rvr and the pressure adjusting fluid reservoir portion Rvc each becomes independent reservoirs. The master reservoir RV is provided with a fluid surface level sensor SH that detects the fluid surface level height Sh (corresponds to the "residual amount Mb") of the brake fluid BF.

The master cylinder CM is mechanically connected to the brake operating member BP through a brake rod RD or the like. A tandem type is adopted for the master cylinder CM. In the master cylinder CM, two fluid pressure chambers (front wheel and rear wheel fluid pressure chambers) Rmf and Rmr are formed by a primary piston PG and a secondary piston PH. When the brake operating member BP is not operated, the front wheel and rear wheel fluid pressure chambers Rmf and Rmr of the master cylinder CM and the master reservoir RV are brought into a communicating state so that the brake fluid BF is replenished when the brake fluid BF is insufficient.

When the brake operating member BP is operated, the primary and secondary pistons PG and PH in the master cylinder CM are pushed in the forward direction Ha, and the fluid pressure chamber Rm (=Rmf, Rmr) is blocked from the master reservoir RV. Furthermore, when the operation of the brake operating member BP is increased, the pistons PG and PH are moved in the forward direction Ha, the volume of the fluid pressure chamber Rm decreases, and the brake fluid (working liquid) BF is discharged from the master cylinder CM. When the operation of the brake operating member BP is increased, the pistons PG and PH are moved in the backward direction Hb, the volume of the fluid pressure chamber Rm increases, and the brake fluid (working liquid) BF is returned toward the master cylinder CM.

The front wheel fluid pressure chamber Rmf of the tandem type master cylinder CM and the two (left and right) front wheel cylinders CWf are connected by a front wheel connection path HSf. Furthermore, the rear wheel fluid pressure chamber Rmr and the two (left and right) rear wheel cylinders CWr are connected by a rear wheel fluid path HSr. The front wheel and rear wheel connection paths HSf and HSr are fluid paths, and are filled with the brake fluid BF therein. The front wheel and rear wheel connection paths HSf and HSr are branched into two at the branch portions Bbf and Bbr, and are connected to the left and right front wheel and rear wheel cylinders CWf and CWr.

The operation amount Ba of the brake operating member (brake pedal) BP by the driver is detected by the braking operation amount sensor BA. Specifically, as the braking operation amount sensor BA, at least one of a master cylinder fluid pressure sensor PM (=PMf, PMr) that detects the fluid pressure (master cylinder fluid pressure) Pm (=Pmf, Pmr) in the fluid pressure chamber Rm, an operation displacement sensor SP that detects the operation displacement Sp of the brake operating member BP, and an operation force sensor FP that detects the operation force Fp of the brake operating member BP is adopted. That is, the operation amount sensor BA is a generic name of the master cylinder fluid pressure sensor PM, the operation displacement sensor SP, and the operation force sensor FP, and the operation amount Ba is a generic name of the master cylinder fluid pressure Pm, the operation displacement Sp, and the operation force Fp.

The wheel speed Vw, which is the rotation speed of each wheel WH, is detected by the wheel speed sensor VW. The signal of the wheel speed Vw is used for anti-lock brake control or the like for suppressing the lock tendency (i.e., excessively large deceleration slip) of the wheel WH. Each wheel speed Vw detected by the wheel speed sensor VW is input to a controller ECU. The controller ECU calculates a vehicle body speed Vx based on the wheel speed Vw.

<<Braking Control Device SC>>

The braking control device SC is configured by a stroke simulator SS, a simulator valve VS, a fluid unit HU, and a controller ECU.

The stroke simulator (also simply referred to as a simulator) SS is provided to cause the brake operating member BP to generate an operation force Fp. In this case, the operation characteristic of the brake operating member BP (relationship between the operation displacement Sp and the operation force Fp) is formed by the simulator SS. The simulator SS is connected to the master cylinder CM (e.g., the front wheel fluid pressure chamber Rmf). A simulator piston and an elastic body (e.g., compression spring) are provided inside the simulator SS. When the brake fluid BF is moved into the simulator SS from the front wheel fluid pressure chamber Rmf, the simulator piston is pushed by the inflowing brake fluid BF. A force is applied to the simulator piston in a direction of inhibiting the inflow of the brake fluid BF by the elastic body, so that the operation force Fp corresponding to the operation displacement Sp is generated when the brake operating member BP is operated.

A simulator valve VS is provided between the front wheel fluid pressure chamber Rmf and the simulator SS. The simulator valve VS is a normally-closed type electromagnetic valve (on/off valve). In the "on/off valve", an open position and a closed position are selectively realized. When the braking control device SC is started, the simulator valve VS is opened, and the master cylinder CM and the simulator SS are brought into a communicating state. When the capacity of the front wheel fluid pressure chamber Rmf is sufficiently larger than the capacity of the front wheel cylinder CWf, the simulator valve VS may be omitted. The simulator SS may be connected to the rear wheel fluid pressure chamber Rmr.

The fluid unit HU is configured to include front wheel and rear wheel separation valves VMf and VMr, front wheel and rear wheel master cylinder fluid pressure sensors PMf and PMr, a pressure adjusting unit YC, front wheel and rear wheel communication valves VRf and VRr, front wheel and rear wheel adjustment fluid pressure sensors PPf and PPr, front wheel and rear wheel inlet valves VIf and VIr, and front wheel and rear wheel outlet valves VOf and VOr.

The front wheel and rear wheel separation valves VMf and VMr are provided in the front wheel and rear wheel connection paths HSf and HSr. The simulator SS is connected to the front wheel fluid pressure chamber Rmf. The front wheel and rear wheel separation valves VMf, VMr are normally-open type electromagnetic valve (on/off valve) having an open position and a closed position. When the braking control device SC is started, the front wheel and rear wheel separation valves VMf and VMr are closed, and the master cylinder CM and the front wheel and rear wheel cylinders CWf and CWr are brought into a blocked state (non-communicating state). That is, the connection between the master cylinder CM and the front wheel and rear wheel cylinders CWf and CWr is separated by the closed positions of the front wheel and rear wheel separation valves VMf and VMr.

front wheel and rear wheel master cylinder fluid pressure sensors PMf and PMr are provided above the front wheel and rear wheel separation valves VMf and VMr so as to detect fluid pressures (master cylinder fluid pressures) Pmf and Pmr of the front wheel and rear wheel fluid pressure chambers Rmf and Rmr. The master cylinder fluid pressure sensor PM (=PMf, PMr) corresponds to the operation amount sensor BA, and the master cylinder fluid pressure Pm corresponds to the operation amount Ba. Since the front wheel and rear wheel master cylinder fluid pressures Pmf and Pmr are substantially the same, either one of the front wheel and rear wheel master cylinder fluid pressure sensors PMf and PMr can be omitted.

—Pressure Adjusting Unit YC (First Embodiment)—

A pressure adjusting unit YC according to the first embodiment will be described. In the pressure adjusting unit YC, the circulation flow KN of the brake fluid BF is formed by the fluid pump HP driven by the electric motor MT. The circulation flow KN is throttled by the pressure adjusting valve UA to adjust the adjustment fluid pressure Pp. Then, the brake fluid BF adjusted to the adjustment fluid pressure Pp is supplied to the front wheel and rear wheel cylinders CWf and CWr.

Hereinafter, details of the pressure adjusting unit YC will be described. The fluid pump HP is provided in the reflux path HK. The reflux path HK is a fluid path provided in parallel to the front wheel and rear wheel connection paths HSf and HSr, and connects a suction portion Bs and a discharge portion Bt of the fluid pump HP. The fluid pump HP is driven by the electric motor MT. The electric motor MT and the fluid pump HP are fixed such that the fluid pump HP and the electric motor MT rotate integrally. When the electric motor MT is rotationally driven, a reflux KN (flow of "Bt→Bvf→Bvr→Bw→Bx→Bs→Bt") of the brake fluid BF is generated in the reflux path HK as indicated by a broken line arrow. Here, "reflux" means that the brake fluid BF circulates and again returns to the original flow. A non-return valve (also referred to as a "check valve") is provided in the reflux path HK so that the brake fluid BF does not reverse flow.

The pressure adjusting valve UA is provided in the reflux path HK. The pressure adjusting valve UA is a normally-open type linear electromagnetic valve (an electromagnetic valve whose valve opening amount is continuously adjusted, and is also called a "proportional valve" or a "differential pressure valve".). The circulation flow KN of the brake fluid BF is throttled by the pressure adjusting valve UA, and the fluid pressure Pp (referred to as "adjustment fluid pressure") of the upstream portion (e.g., sites Bvf and Bvr) of the pressure adjusting valve UA is adjusted. In other words, the pressure of the brake fluid BF discharged from the fluid pump HP is adjusted to the adjustment fluid pressure Pp by the pressure adjusting valve UA.

The low pressure reservoir RW is connected to the reflux path HK at the site Bx. The low pressure reservoir RW is a tank (fluid reservoir) for storing the brake fluid BF different (separate) from the master reservoir RV for supplying the brake fluid BF to the fluid pump HP. A reservoir piston is provided inside the cylinder of the low pressure reservoir RW. The reservoir piston partitions the inside of the cylinder into a liquid chamber Rw (also referred to as a "low-pressure reservoir chamber") filled with the brake fluid BF and a gas chamber filled with gas. A compression spring is accommodated in the liquid chamber Rw so as to press the reservoir piston toward the gas chamber.

The low pressure reservoir RW is provided in proximity to the fluid pump HP (in particular, the suction portion Bs). For example, the fluid unit HU is integrally assembled such that the low pressure reservoir RW is incorporated in the fluid unit HU. Alternatively, the low pressure reservoir RW may be connected to the fluid unit HU by a short pipe. That is, the low pressure reservoir RW (in particular, the liquid chamber Rw) is disposed in the vicinity of the fluid pump HP. Therefore, the pipe line resistance and the like are reduced, and the responsiveness can be improved in the increase in the brake fluid pressure Pw.

In order to downsize the low pressure reservoir RW, the reflux path HK is connected to the master reservoir RV (in particular, the pressure adjusting fluid reservoir portion Rvc) via the reservoir path HV which is a fluid path. Since the brake fluid BF is sucked from the low pressure reservoir RW at the initial stage of braking, the boosting responsiveness of the brake fluid pressure Pw is improved. In the fluid pump HP, when the brake fluid BF is sufficiently sucked from the master reservoir RV, the low pressure reservoir RW may be omitted.

The reflux path HK of the pressure adjusting unit YC and the front wheel and rear wheel connection paths HSf and HSr are connected by the front wheel and rear wheel communication paths HRf and HRr. Specifically, the front wheel and rear wheel communication paths HRf and HRr are fluid paths connecting the lower portions Buf, Bur of the front wheel and rear wheel separation valves VMf, VMr of the front wheel and rear wheel connection paths HSf and HSr, and the downstream portions (upstream portions of the pressure adjusting valve UA) Bvf and Bvr of the discharge portion Bt of the fluid pump HP. The front wheel and rear wheel communication valves VRf, VRr are provided in the front wheel and rear wheel communication paths HRf, HRr. The communication valve VR (=VRf, VRr) is a normally-closed type on/off valve having an open position and a closed position. At the time of startup of the braking control device SC, the communication valve VR is opened, and the connection path HS (=HSf, HSr) and the reflux path HK are brought into a communicating state. Then, the brake fluid BF adjusted to the adjustment fluid pressure Pp by the pressure adjusting unit YC is supplied to the front wheel and rear wheel cylinders CWf and CWr. The front wheel and rear wheel adjustment fluid pressure sensors PPf, PPr are provided in the front wheel and rear wheel connection paths HSf and HSr so as to detect the adjustment fluid pressure Pp.

In the front wheel and rear wheel connection paths HSf and HSr, the configurations from the branch portions Bbf and Bbr to the lower portion (the side close to the wheel cylinder CW) are the same. The inlet valve VI (=VIf, VIr) is provided in the connection path HS (=HSf, HSr). As the inlet valve VI, a normally-open type on/off electromagnetic valve is employed.

A pressure reducing path HG is connected at a lower portion Bg (i.e., between the inlet valve VI and the wheel cylinder CW) of the inlet valve VI. The pressure reducing path HG is connected to the low pressure reservoir RW (also serving as the "suction portion Bs of the fluid pump HP"). The outlet valve VO (=VOf, VOr) is provided in the pressure reducing path HG. As the outlet valve VO, a normally-closed type on/off electromagnetic valve is employed. The inlet valve VI and the outlet valve VO are collectively referred to as a "fluid pressure modulator".

The controller ECU (also referred to as "electronic control unit") controls the electric motor MT, and the electromagnetic valves UA, VM, VR, VS, VI, VO. The controller ECU includes an electric circuit substrate on which a microprocessor MP or the like is mounted, and a control algorithm programmed in the microprocessor MP. The controller ECU is network connected to a controller (electronic control unit) of another system through an in-vehicle communication bus BS.

The controller ECU controls the electric motor MT and the electromagnetic valves (VM, etc.) based on various signals (Ba, Pp, Vw, Sh, etc.). Specifically, a motor drive signal Mt for controlling the electric motor MT is calculated based on the control algorithm in the microprocessor MP. Similarly, the electromagnetic valve drive signals Ua, Vm, Vr, Vs, Vi, and Vo for controlling the electromagnetic valves UA, VM, VR, VS, VI, and VO are calculated. Then, the electric motor and the plurality of electromagnetic valves are driven based on these drive signals (Vm, Mt, etc.).

At the time of regular use braking, the controller ECU controls the pressure adjusting unit YC and the fluid pressure servo control is executed. Here, the "fluid pressure servo control" is a control in which the actual front wheel and rear wheel adjustment fluid pressures Ppf and Ppr (as a result, the front wheel and rear wheel brake fluid pressures Pwf and Pwr) are matched with the target fluid pressure Pt calculated based on the braking operation amount Ba and the like. For example, in the fluid pressure servo control, the target fluid pressure Pt is determined to increase as the braking operation amount Ba increases, and the energization amount to the pressure adjusting valve UA is feedback-controlled so that the deviation between the target fluid pressure Pt and the adjustment fluid pressure Pp (detection value) approaches "0".

When the deceleration slip of the wheel WH becomes excessively large, the controller ECU controls the inlet valve VI and the outlet valve VO (i.e., the fluid pressure modulator) to perform an anti-lock brake control (also referred to as "ABS control"). For example, in the anti-lock brake control, the inlet valve VI is set to the closed position and the outlet valve VO is set to the open position in order to reduce the fluid pressure Pw in the wheel cylinder CW. The inflow of the brake fluid BF from the inlet valve VI is inhibited, the brake fluid BF in the wheel cylinder CW flows out to the low pressure reservoir RW, and the brake fluid pressure Pw is reduced. Furthermore, in order to increase the brake fluid pressure Pw, the inlet valve VI is set to the open position and the outlet valve VO is set to the closed position. The outflow of the brake fluid BF to the low pressure reservoir RW is inhibited, the adjustment fluid pressure Pp is introduced into the wheel cylinder CW, and the brake fluid pressure Pw is increased. Furthermore, in order to hold the fluid pressure (brake fluid pressure) Pw in the wheel cylinder CW, both the inlet valve VI and the outlet valve VO are closed. That is, the brake fluid pressure Pw (i.e., the braking torque Tq) can be independently adjusted in the wheel cylinder CW of each wheel WH by controlling the fluid pressure modulators VI and VO.

<Processing of External Leakage Control>

Figure 2:
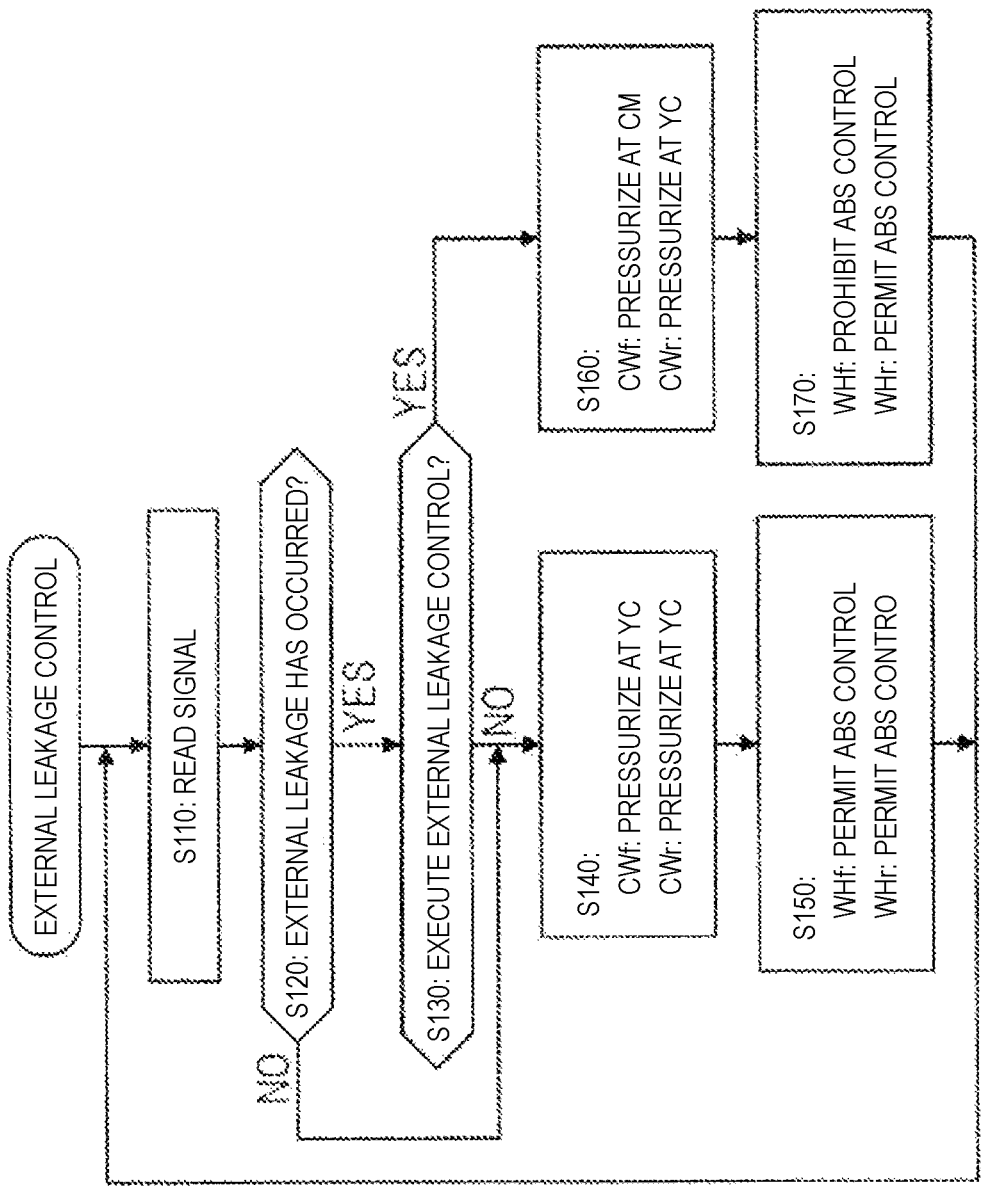
FIG. 2 is a flowchart explaining a process of an external leakage control.

The processing of the external leakage control will be described with reference to the flowchart of FIG. 2. Here, the "external leakage" is leakage of the brake fluid BF from the braking control device SC to the outside. When the external leakage occurs, the fluid amount in the master reservoir RV for supplying the insufficient amount of brake fluid BF reduces (i.e., the fluid surface level of the brake fluid BF in the master reservoir RV decreases.). The external leakage occurs due to damage of the fluid path (HS, HR, etc.) from the master reservoir RV to the wheel cylinder CW including the master reservoir RV and the wheel cylinder CW, the electromagnetic valve (VM, UA, etc.), the fluid pump HP, and the like, but it is difficult to specify at which site the external leakage occurs. The "external leakage control" is a control processing in a case where occurrence of the external leakage is identified. The deceleration and stability of the vehicle are secured by the external leakage control.

In step S110, various signals such as the braking operation amount Ba, the adjustment fluid pressure Pp, the wheel speed Vw, and the amount (referred to as a "residual amount") Mb of the brake fluid BF remaining in the braking control device SC are read. For example, the residual amount Mb is a signal calculated based on the fluid surface level height Sh detected by the fluid surface level sensor SH. The residual amount Mb is a signal related to the amount of brake fluid BF remaining in the master reservoir RV. Alternatively, as will be described later, the residual amount Mb may be calculated based on the relationship between the rotation angle Ka (i.e., displacement of the pressure adjusting piston PC) of the electric motor MT and the adjustment fluid pressure Pp. The signal (Mb etc.) read in step S110 may be calculated by another controller, transmitted to the controller ECU via the communication bus BS, and acquired.

In step S120, "whether or not external leakage of the brake fluid BF has occurred" is determined. For example, the occurrence of external leakage is determined as "whether or not the residual amount Mb is less than or equal to a determination predetermined amount mh". The determination predetermined amount mh is a predetermined value (determination threshold value, constant) set in advance to determine the occurrence of external leakage. For example, when "Mb>mh" and no external leakage has occurred, negative determination is made in step S120, and the process proceeds to step S140.

On the other hand, when the external leakage of the brake fluid BF has occurred (e.g., when the residual amount Mb is less than or equal to the determination predetermined amount mh,), first, the driver is notified that the external leakage has occurred. The occurrence of external leakage is notified to the driver by visual sense (e.g., turning on the lamp), auditory sense (e.g., notification sound), tactile sense (e.g., vibration for notification), or the like. When positive determination is made in step S120, the process proceeds to step S130.

In step S130, "whether or not the external leakage control is executed" is determined. For example, the determination is made based on "whether or not the residual amount Mb of the brake fluid BF in the braking control device SC (master reservoir RV etc.) is less than or equal to an execution predetermined amount mx". Here, the execution predetermined amount mx (corresponding to the "predetermined amount") is a predetermined value (a threshold value, wherein the threshold value is a constant) set in advance. The execution predetermined amount mx is set to a value smaller than the determination predetermined amount mh (i.e., "mx<mh"). Thus, the driver is notified that the external leakage has occurred before the start of the execution of the external leakage control.

As the execution predetermined amount mx, the height Sh of the level of the brake fluid in the master reservoir RV is adopted. In this case, the execution predetermined amount mx may be set to be higher than the height sk of the partition plate SK. With this setting, the execution of the external leakage control is started early before the fluid reservoir portions Rvf, Rvr, and Rvc become separate fluid reservoirs. In addition, the residual amount Mb (fluid surface level height Sh) can be detected by one fluid surface level sensor SH. Note that the detection unit of the fluid surface level sensor SH may be duplicated to ensure redundancy.

When the execution of the external leakage control is denied (e.g., in the case of "Mb>mx",), negative determination is made in step S130, and the process proceeds to step S140. When the execution of the external leakage control is affirmed (e.g., in the case of "Mb≤mx",), positive determination is made in step S130, and the process proceeds to step S160.

In step S140, since the occurrence of external leakage is denied, normal fluid pressure servo control ("servo braking" described later) is performed. Then, the fluid pressures Pwf, Pwr of the front wheel and rear wheel cylinders CWf, CWr are pressurized by the pressure adjusting unit YC. Specifically, in the fluid pressure servo control, the separation valve VM is closed, the communication valve VR is opened, and the target fluid pressure Pt is determined to increase according to the increase in the braking operation amount Ba. Feedback control is performed based on the detection value of the adjustment fluid pressure Pp so that the adjustment fluid pressure Pp approaches and matches the target fluid pressure Pt. Then, the brake fluid BF adjusted to the adjustment fluid pressure Pp by the pressure adjusting unit YC is supplied to the front wheel and rear wheel cylinders CWf and CWr.

In step S150, the operations of the anti-lock brake control (ABS control) on the front wheel WHf and the rear wheel WHr are both permitted. That is, when an excessively large deceleration slip occurs at the wheel WH, normal anti-lock brake control is performed through the fluid pressure modulators VI and VO.

In steps S160 and S170, external leakage control is executed. First, in step S160, the fluid pressure (front wheel brake fluid pressure) Pwf of the left and right front wheel cylinders CWf is pressurized by the master cylinder CM. That is, the front wheel separation valve VMf is opened, the front wheel communication valve VRf is closed, and the front wheel brake fluid pressure Pwf is increased only by the muscle strength (operation force Fp) of the driver. Braking only by the muscle strength of the driver is called "manual braking". On the other hand, the rear wheel separation valve VMr is closed, the rear wheel communication valve VRr is opened, and the fluid pressure (rear wheel brake fluid pressure) Pwr of the left and right rear wheel cylinders CWr is pressurized by the pressure adjusting unit YC of the fluid unit HU. The braking by the pressure adjusting unit YC is called "servo braking".

In the external leakage control, the brake fluid pressure Pwf of the left and right front wheels WHf is pressurized by the master cylinder CM, and the brake fluid pressure Pwr of the left and right rear wheels WHr is pressurized (pressurized by servo braking) by the pressure adjusting unit YC of the fluid unit HU for the following reasons. In the braking control device SC, a front-rear type braking system (i.e., the front wheel and rear wheel braking systems BKf and BKr)

is adopted, and the same fluid pressure is applied to the left and right wheel cylinders CW (=CWf, CWr), so that a left/right difference in braking force does not occur. Therefore, vehicle deflection caused by the left/right difference in braking force does not occur.

In the external leakage in which the brake fluid BF leaks from the braking control device SC to the outside, it is difficult to specify a site where the brake fluid BF is leaking, such as in which of the front wheel and rear wheel braking systems BKf and BKr the external leakage has occurred.

Since the front wheel load increases and the rear wheel load decreases at the time of braking, various specifications are set so that the contribution of the front wheel braking force becomes larger than the contribution of the rear wheel braking force in vehicle deceleration (i.e., the total braking force acting on the vehicle). Specifically, the front wheel area ratio, which is the ratio of the pressure receiving area of the front wheel cylinder CWf with respect to the pressure receiving area of the master cylinder CM, is set to be larger than the rear wheel area ratio, which is the ratio of the pressure receiving area of the rear wheel cylinder CWr with respect to the pressure receiving area of the master cylinder CM. The effective braking radius of the front wheel rotation member KTf is set to be larger than the effective braking radius of the rear wheel rotation member KTr.

When external leakage occurs in the rear wheel braking system BKr, the rear wheel braking force decreases, but as the wheel cylinder CWf of the front wheel WHf is pressurized by manual braking by the above specification setting, sufficient front wheel braking force is secured. In addition, even if external leakage occurs in the rear wheel braking system BKr, since the front wheel communication valve VRf is closed, external leakage of the brake fluid BF of the front wheel braking system BKf is suppressed.

When external leakage occurs in the front wheel braking system BKf, the front wheel braking force decreases. Furthermore, according to the above specification setting, since the contribution of the rear wheel braking force is smaller than the contribution of the front wheel braking force in vehicle deceleration, when the wheel cylinder CWr of the rear wheel WHr is pressurized by manual braking, sufficient rear wheel braking force cannot be obtained. Therefore, in the external leakage control, sufficient rear wheel braking force is secured by pressurizing the wheel cylinder CWr of the rear wheel WHr by servo braking. In addition, even if external leakage occurs in the front wheel braking system BKf, since the front wheel communication valve VRf is closed, external leakage of the brake fluid BF of the rear wheel braking system BKr is suppressed.

In step S170, whether the anti-lock brake control related to the external leakage control is permitted or prohibited is determined. Specifically, the operation of the anti-lock brake control (ABS control) on the front wheel WHf is prohibited, and the operation of the anti-lock brake control on the rear wheel WHr is permitted. In the external leakage control, the front wheel brake fluid pressure Pwf is increased by manual braking by the master cylinder CM, and the rear wheel brake fluid pressure Pwr is increased by the pressure adjusting unit YC by servo braking. In this case, since the rear wheel brake fluid pressure Pwr is servo-controlled by the pressure adjusting unit YC, the contribution of the front wheel braking force relatively decreases and the contribution of the rear wheel braking force relatively increases as compared with the case where the external leakage control is not executed (execution of the process of step S140) in the total braking force acting on the entire vehicle.

During the execution of the external leakage control, since the front wheel cylinder CWf is pressurized by manual braking and the front wheel communication valve VRf is closed, when the anti-lock brake control is executed on the front wheel WHf, the brake fluid BF discharged from the front wheel cylinder CWf to the low pressure reservoir RW cannot be returned to the front wheel braking system BKf, the brake fluid shortage of the front wheel braking system BKf occurs, and the front wheel braking force may not be sufficiently obtained. Therefore, during the execution of the external leakage control, the execution of the anti-lock brake control is prohibited on the front wheel WHf. On the other hand, since the stability of the vehicle may be impaired when an excessively large deceleration slip occurs at the rear wheel WHr, execution of the anti-lock brake control is permitted for the rear wheel WHr. Even if the anti-lock brake control is executed for the rear wheel WHr, since the rear wheel communication valve VRr is opened by servo braking, the brake fluid BF discharged from the rear wheel cylinder CWr to the low pressure reservoir RW can be returned to the rear wheel braking system BKr, the brake fluid shortage of the rear wheel braking system BKr occurs, and the rear wheel braking force is sufficiently obtained. As a result, even when the external leakage control is executed, sufficient vehicle deceleration is obtained, and directional stability of the vehicle is secured.

<Second Embodiment of Braking Control Device for Vehicle>

Figure 3:
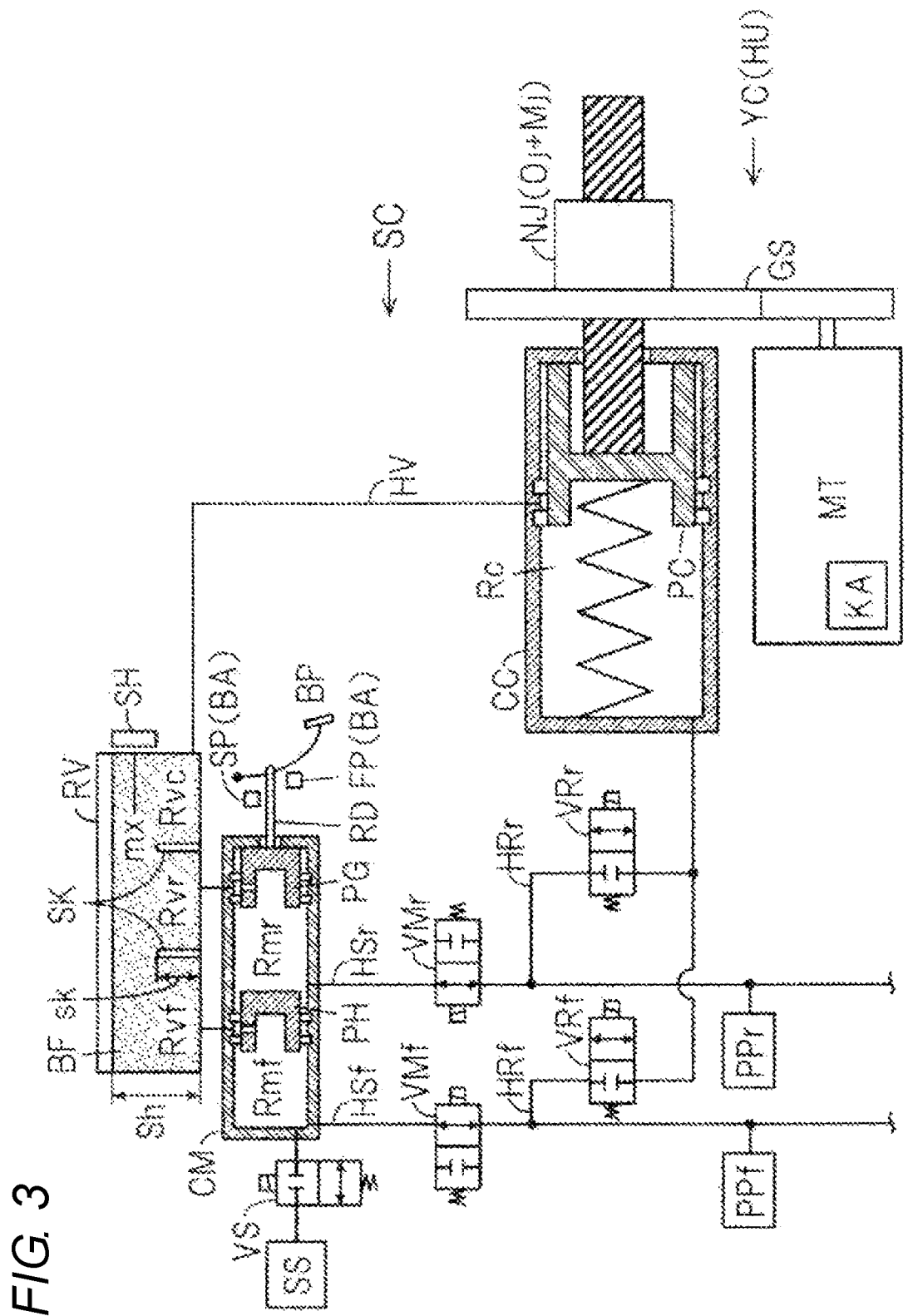
FIG. 3 is a schematic view for describing a second embodiment of a braking control device SC for a vehicle.

A second embodiment of a braking control device SC according to the present disclosure will be described with reference to a schematic view of FIG. 3. In the second embodiment as well, the tandem type master cylinder CM is adopted, and the front-rear type is adopted for the fluid paths of two systems.

In the pressure adjusting unit YC of the first embodiment, the adjustment fluid pressure Pp is adjusted by the pressure adjusting valve UA in the reflux path HK including the fluid pump HP. In the pressure adjusting unit YC of the second embodiment, the adjustment fluid pressure Pp is directly subjected to the fluid pressure servo control by the rotational power of the electric motor MT. Since the components other than the pressure adjusting unit YC are similar to those of the braking control device SC according to the first embodiment, the difference will be described.

—Pressure Adjusting Unit YC (Second Embodiment)—

The pressure adjusting unit YC included in the fluid unit HU is configured by an electric motor MT, a speed reducer GS, a rotation/linear motion conversion mechanism (e.g., screw mechanism) NJ, a pressure adjusting piston PC, and a pressure adjusting cylinder CC.

Therefore, the rotational power of the electric motor MT is reduced by the speed reducer GS and transmitted to the screw mechanism (corresponds to "conversion mechanism") NJ. Specifically, a small-diameter gear is fixed to an output shaft of the electric motor MT. The small-diameter gear is engaged with a large-diameter gear, and a rotation shaft thereof is fixed to a bolt member Oj of the screw mechanism (conversion mechanism) NJ. The screw mechanism (rotation/linear motion conversion mechanism) NJ is configured by a bolt member Oj and a nut member Mj. In the screw mechanism NJ, the rotational power of the speed reducer GS is converted into the linear power of the pressure adjusting piston PC. When the pressure adjusting piston PC is pushed by the nut member Mj of the screw mechanism NJ, it is converted into linear power of the pressure adjusting piston PC. As the screw mechanism NJ, a "sliding screw" such as a trapezoidal screw is employed. Furthermore, as the screw mechanism NJ, a "rolling screw" such as a ball screw is employed.

The pressure adjusting piston PC is inserted into an inner hole of the pressure adjusting cylinder CC, and a combination of "piston/cylinder" is formed. Specifically, the "inner peripheral surface and bottom surface of the pressure adjusting cylinder CC" and the "end surface of the pressure adjusting piston PC" form a fluid pressure chamber Rc (referred to as "pressure adjusting chamber"). The pressure adjusting chamber Rc is connected to the front wheel and rear wheel connection paths HSf and HSr through the front wheel and rear wheel communication paths HRf and HRr. As the pressure adjusting piston PC is moved, the volume of the pressure adjusting chamber Rc changes. At this time, since the front wheel and rear wheel communication valves VRf and VRr are opened and the front wheel and rear wheel separation valves VMf and VMr are closed, the brake fluid BF is not returned to the front wheel and rear wheel fluid pressure chambers Rmf and Rmr but is moved with respect to the front wheel and rear wheel cylinders CWf and CWr.

When the electric motor MT is rotationally driven in the forward rotating direction, the volume of the pressure adjusting chamber Rc decreases, and the adjustment fluid pressure Pp (i.e., the brake fluid pressure Pw) increases.

On the other hand, when the electric motor MT is rotationally driven in the reverse rotating direction, the volume of the pressure adjusting chamber Rc increases, and the brake fluid BF is returned from the front wheel and rear wheel cylinders CWf and CWr to the pressure adjusting cylinder CC. As a result, the adjustment fluid pressure Pp (=Pw) is reduced. A return spring (elastic body) is provided in the pressure adjusting chamber Rc, and the pressure adjusting piston PC is returned to its initial position when the energization to the electric motor MT is stopped. When the pressure adjusting piston PC is returned to the initial position, the pressure adjusting chamber Rc and the pressure adjusting reservoir portion Rvc are brought into a communicating state through the reservoir path HV. When the brake fluid BF is insufficient in the pressure adjusting chamber Rc, the brake fluid BF is supplied from the pressure adjusting reservoir portion Rvc. Similar to the first embodiment, the master reservoir RV is provided with a fluid surface level sensor SH to detect the fluid surface level height Sh.

When the external leakage control is executed, the front wheel separation valve VMf is opened, and the master cylinder CM and the front wheel cylinder CWf are brought into a communicating state. Furthermore, the front wheel communication valve VRf is closed, and the pressure adjusting cylinder CC (pressure adjusting chamber Rc) and the front wheel cylinder CWf are brought into a non-communicating state. On the other hand, the rear wheel separation valve VMr is kept closed, the rear wheel communication valve VRr is kept open, and the brake fluid BF adjusted to the adjustment fluid pressure Pp is supplied to the rear wheel cylinder CWr. That is, the left and right front wheel brake fluid pressures Pwf are increased by manual braking, and the left and right rear wheel brake fluid pressures Pwr are increased by servo braking. The braking control device SC according to the second embodiment also has the same effects as those described above.

Similar to the pressure adjusting unit YC according to the second embodiment, that in which a pressure adjusting unit in which the adjustment fluid pressure Pp is adjusted by moving the pressure adjusting piston PC in the pressure adjusting cylinder CC by the rotational power of the electric motor MT is called an "electric cylinder". In the electric cylinder, the residual amount Mb can be determined based on the relationship between the displacement of the pressure adjusting piston PC and the adjustment fluid pressure Pp instead of the fluid surface level height Sh (alternatively, in addition to the fluid surface level height Sh). Specifically, when the external leakage has occurred, the amount of brake fluid BF in the braking control device SC reduces, and thus the adjustment fluid pressure Pp becomes small with respect to the displacement from the initial position of the pressure adjusting piston PC as compared with a case where the external leakage has not occurred. In other words, "Pp=0" occurs before the pressure adjusting piston PC returns to the initial position (e.g., before the pressure adjusting chamber Rc and the pressure adjusting reservoir portion Rvc are brought into a communicating state). Here, the displacement of the pressure adjusting piston PC is detected by a displacement sensor (not illustrated). Since specifications of the speed reducer GS, the rotation/linear motion conversion mechanism NJ, and the like are known, the calculation may be performed based on the rotation angle Ka, which is a detection result of the rotation angle sensor KA provided in the electric motor MT.

OTHER EMBODIMENTS

In the braking control device SC according to the first and second embodiments, the tandem type master cylinder CM is adopted. The present disclosure can also be applied to a braking control device SC employing a single type master cylinder CM (see, e.g., FIG. 1 of DE102017221349A). That is, the present disclosure can be used for a brake-by-wire braking control device SC employing a front-rear type as a braking system. Other embodiments also have the same effects as those described above.

Summary of Embodiments and Operations/Effects

A braking control device SC includes a "master cylinder CM capable of pressure feeding brake fluid BF in conjunction with the movement of a brake operating member BP of a vehicle", an "electrically driven fluid unit HU", "front wheel and rear wheel cylinders CWf, CWr that are provided on the front wheel and rear wheels WHf, WHr of the vehicle and are pressurized by either one of the master cylinder CM and the fluid unit HU", and a "controller ECU that controls the fluid unit HU". Then, in the controller ECU, the braking control device determines whether or not external leakage of the brake fluid BF has occurred, and when the external leakage has occurred, the two front wheel cylinders CWf are pressurized by the master cylinder CM (i.e., manual braking is performed.). On the other hand, the two rear wheel cylinders CWr are pressurized by the fluid unit HU (in particular, the pressure adjusting unit YC) (i.e., servo braking is performed.). For example, whether "the external leakage has occurred" is determined based on "the residual amount Mb being less than or equal a predetermined amount (execution predetermined amount) mx". Such a control is called "external leakage control".

In the braking control device SC, since the front-rear type braking system is adopted, even if the external leakage control executed under the condition of "Mb mx" is performed, the left/right difference in the braking force does not occur, and the vehicle deflection caused by this is unlikely to occur. It is difficult to specify a site where the external leakage has occurred. In the deceleration (i.e., total braking force of the vehicle) of the vehicle, various specifications (pressure receiving area of the wheel cylinder CW with respect to the pressure receiving area of the master cylinder CM, effective braking radius of the rotation member KT, friction coefficient of the friction material, etc.) are set so that the contribution of the front wheel braking force becomes larger than the contribution of the rear wheel braking force. When external leakage control is performed and external leakage occurs in the rear wheel braking system BKr, sufficient front wheel braking force is secured by pressurizing the wheel cylinder CWf of the front wheel WHf by manual braking. In addition, even if external leakage occurs in the rear wheel braking system BKr, since the front wheel communication valve VRf is closed, external leakage of the brake fluid BF of the front wheel braking system BKf is suppressed. On the other hand, when the external leakage occurs in the front wheel braking system BKf, sufficient rear wheel braking force is secured by pressurizing the wheel cylinder CWr of the rear wheel WHr by servo braking. In addition, even if external leakage occurs in the front wheel braking system BKf, since the front wheel communication valve VRf is closed, external leakage of the brake fluid BF of the rear wheel braking system BKr is suppressed.

The fluid unit HU of the braking control device SC includes an inlet valve VI and an outlet valve VO (collectively referred to as a "fluid pressure modulator") for executing the anti-lock brake control for suppressing excessively large deceleration slip of the front wheel WHf and the rear wheel WHr. In the anti-lock brake control related to the external leakage control, when external leakage occurs, the operation of the anti-lock brake control on the front wheel WHf is prohibited, and the operation of the anti-lock brake control on the rear wheel WHr is permitted. That is, during the execution of the external leakage control of step S160, the operation of the anti-lock brake control on the front wheel WHf is prohibited, and the operation of the anti-lock brake control on the rear wheel WHr is permitted.

During the execution of the external leakage control, since the front wheel cylinder CWf is pressurized by manual braking and the front wheel communication valve VRf is closed, when the anti-lock brake control is executed on the front wheel WHf, the brake fluid BF discharged from the front wheel cylinder CWf to the low pressure reservoir RW cannot be returned to the front wheel braking system BKf, the brake fluid shortage of the front wheel braking system BKf occurs, and the front wheel braking force may not be sufficiently obtained. Therefore, during the execution of the external leakage control, the execution of the anti-lock brake control is prohibited on the front wheel WHf. On the other hand, since the stability of the vehicle may be impaired when an excessively large deceleration slip occurs at the rear wheel WHr, execution of the anti-lock brake control is permitted for the rear wheel WHr. Even if the anti-lock brake control is executed for the rear wheel WHr, since the rear wheel communication valve VRr is opened by servo braking, the brake fluid BF discharged from the rear wheel cylinder CWr to the low pressure reservoir RW can be returned to the rear wheel braking system BKr, the brake fluid shortage of the rear wheel braking system BKr occurs, and the rear wheel braking force is sufficiently obtained. As a result, even when the external leakage control is executed, sufficient vehicle deceleration is obtained, and directional stability of the vehicle is secured.

In the braking control device SC, the inside of the master reservoir RV that supplies the brake fluid BF to the master cylinder CM is partitioned into a plurality of fluid reservoir portions (Rvf, Rvr, Rvc, etc.) by the partition plate SK. Then, the fluid surface level height Sh of the brake fluid BF is adopted as the residual amount Mb, and a predetermined amount mx, which is a threshold value for executing the external leakage control, is set to be larger (higher) than the height sk of the partition plate SK. Thus, the execution of the external leakage control is started early before the fluid reservoir portions Rvf, Rvr, and Rvc become separate fluid reservoirs. When the fluid surface level height Sh is used as the residual amount Mb, it is not necessary to prepare a plurality of fluid surface level sensors SH, and the residual amount Mb (fluid surface level height Sh) can be acquired by one fluid surface level sensor SH.

The invention claimed is:

1. A braking control device for a vehicle comprising:
    a master cylinder capable of pressure feeding a brake fluid in conjunction with movement of a brake operating member of the vehicle;
    an electrically driven fluid unit;
    front wheel and rear wheel cylinders provided on a front wheel and a rear wheel of the vehicle and pressurized by either one of the master cylinder and the fluid unit; and
    a controller that controls the fluid unit,
    the controller is configured to,
        determine whether or not external leakage of a brake fluid has occurred in the braking control device, and
        when the external leakage has occurred, pressurizes the front wheel cylinder by the master cylinder, and pressurizes the rear wheel cylinder by the fluid unit, wherein
    the fluid unit includes a fluid pressure modulator for executing an anti-lock brake control for suppressing an excessively large deceleration slip of the front wheel and the rear wheel; and
    when the external leakage occurs, the controller
        prohibits the operation of the anti-lock brake control on the front wheel, and
        permits the operation of the anti-lock brake control on the rear wheel.

2. The braking control device for the vehicle according to claim 1, wherein
    the controller is configured to,
        acquire a residual amount of a brake fluid in the braking control device; and
        determine that the external leakage has occurred when the residual amount is less than or equal to a predetermined amount.

3. The braking control device for the vehicle according to claim 2, further comprising:
    a master reservoir which supplies a brake fluid to the master cylinder and includes a partition plate that partitions the master cylinder into a plurality of fluid reservoir portions;
    wherein the controller acquires a fluid surface level height of the brake fluid in the master reservoir as the residual amount; and
    the predetermined amount is set higher than a height of the partition plate.

* * * * *